(12) United States Patent
Billou (10) Patent No.: US 10,657,557 B2
(45) Date of Patent: May 19, 2020

(54) SYSTEMS AND METHODS FOR IMPLEMENTING NOTIFICATIONS OF INCENTIVES OFFERED BY FUNDING SOURCES

(71) Applicant: PAYPAL, INC., San Jose, CA (US)

(72) Inventor: Frederic Billou, Woodside, CA (US)

(73) Assignee: PAYPAL, INC., San Jose, CA (US)

( * ) Notice: Subject to any disclaimer, the term of this patent is extended or adjusted under 35 U.S.C. 154(b) by 581 days.

(21) Appl. No.: 14/256,519

(22) Filed: Apr. 18, 2014

(65) Prior Publication Data

US 2015/0302469 A1 Oct. 22, 2015

(51) Int. Cl.
*G06Q 30/02* (2012.01)
(52) U.S. Cl.
CPC ..... *G06Q 30/0253* (2013.01); *G06Q 30/0215* (2013.01); *G06Q 30/0222* (2013.01); *G06Q 30/0261* (2013.01)
(58) Field of Classification Search
CPC .................................. G06Q 30/0207–30/0277
USPC .................................................. 705/14, 319
See application file for complete search history.

(56) References Cited

U.S. PATENT DOCUMENTS

| 7,784,683 B1* | 8/2010 | Segura | G06Q 20/04 235/380 |
|---|---|---|---|
| 2006/0090183 A1* | 4/2006 | Zito | G06F 17/30035 725/46 |
| 2011/0238474 A1* | 9/2011 | Carr | G06Q 30/0639 705/14.23 |
| 2013/0117085 A1* | 5/2013 | Aiello | G06Q 30/0207 705/14.25 |
| 2014/0273981 A1* | 9/2014 | Steinbach | H04W 4/14 455/414.1 |
| 2014/0279006 A1* | 9/2014 | Calman | G06Q 30/0215 705/14.58 |
| 2015/0019320 A1* | 1/2015 | Menendez | G06Q 20/36 705/14.31 |
| 2015/0095157 A1* | 4/2015 | McDevitt | G06Q 30/0261 705/14.58 |

* cited by examiner

*Primary Examiner* — Luis A Brown
*Assistant Examiner* — Richard G Reinhardt
(74) *Attorney, Agent, or Firm* — Haynes and Boone, LLP (57) ABSTRACT

A system and/or method may be provided to notify a user of incentives offered by various funding sources based on the user's location. In particular, incentives offered by various funding sources at various merchant locations are determined. The user's location and movements are monitored. When the user approaches or is near a merchant location where a funding source offers incentives, a notification maybe generated and presented to the user to notify or remind the user of the incentives offered at the merchant location. The notification may include description of the incentives and directions on how to obtain the incentives.

24 Claims, 4 Drawing Sheets

SYSTEMS AND METHODS FOR IMPLEMENTING NOTIFICATIONS OF INCENTIVES OFFERED BY FUNDING SOURCES

BACKGROUND

Field of the Invention

The present invention generally relates to systems and methods for implementing notifications of incentives offered by various funding sources.

Related Art

In today's commerce, many payment transactions, such as retail purchases, fund transactions, and the like, are made electronically using a payment service provider. In particular, a customer may have various funding sources, such as different credit cards, bank accounts, debit cards, and the like, to choose from when making payments. A funding source may partner with a merchant to offer incentives, such as additional cash back or reward points, to entice the customer to utilize the funding source when making purchases at the merchant. Nevertheless, it is often difficult for a customer to remember which funding source to use for which merchant to receive these incentives. Therefore, there is a need for a system or method that helps notify or remind consumers of the incentives offered by various funding sources.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to an embodiment, a system and/or method may be provided to notify a user of incentives offered by various funding sources based on the user's location. In particular, incentives offered by various funding sources at various merchant locations are determined. The user's location and movement are monitored. When the user approaches or is near a merchant location where a funding source offers incentives, a notification maybe generated and presented to the user to notify or remind the user of the incentives offered at the merchant location. The notification may include description of the incentives and directions on where to use or obtain the incentives.

In an embodiment, a system and/or method may be provided to determine a user's funding sources and incentives offered by the user's funding sources. In particular, a list of merchant locations where the incentives are offered may be stored and updated periodically. The system also may allow a user to designate the types or categories of incentives to be presented to the user. For example, the user may allow only food type incentives to be presented to the user. In another example, the user may allow incentives related to discounts equal to or greater than 10% of purchase price to be presented to the user. In an embodiment, the user also may designate when and where notifications may be presented to the user. For example, notifications for incentives may be prohibited from being presented to the user when user is at work or during work hours.

In an embodiment, a notification zone may be assigned to each incentive location or merchant location. The notification zone may define one or more areas within which a user is notified of the incentive offered at the incentive location or merchant. The notification zone may be defined by traffic types or patterns of customers around or near the incentive location or merchant. The notification zone may change based on time, day, or season. Thus, a merchant may define a notification zone that provides effective notifications to nearby customers.

Figure 1:
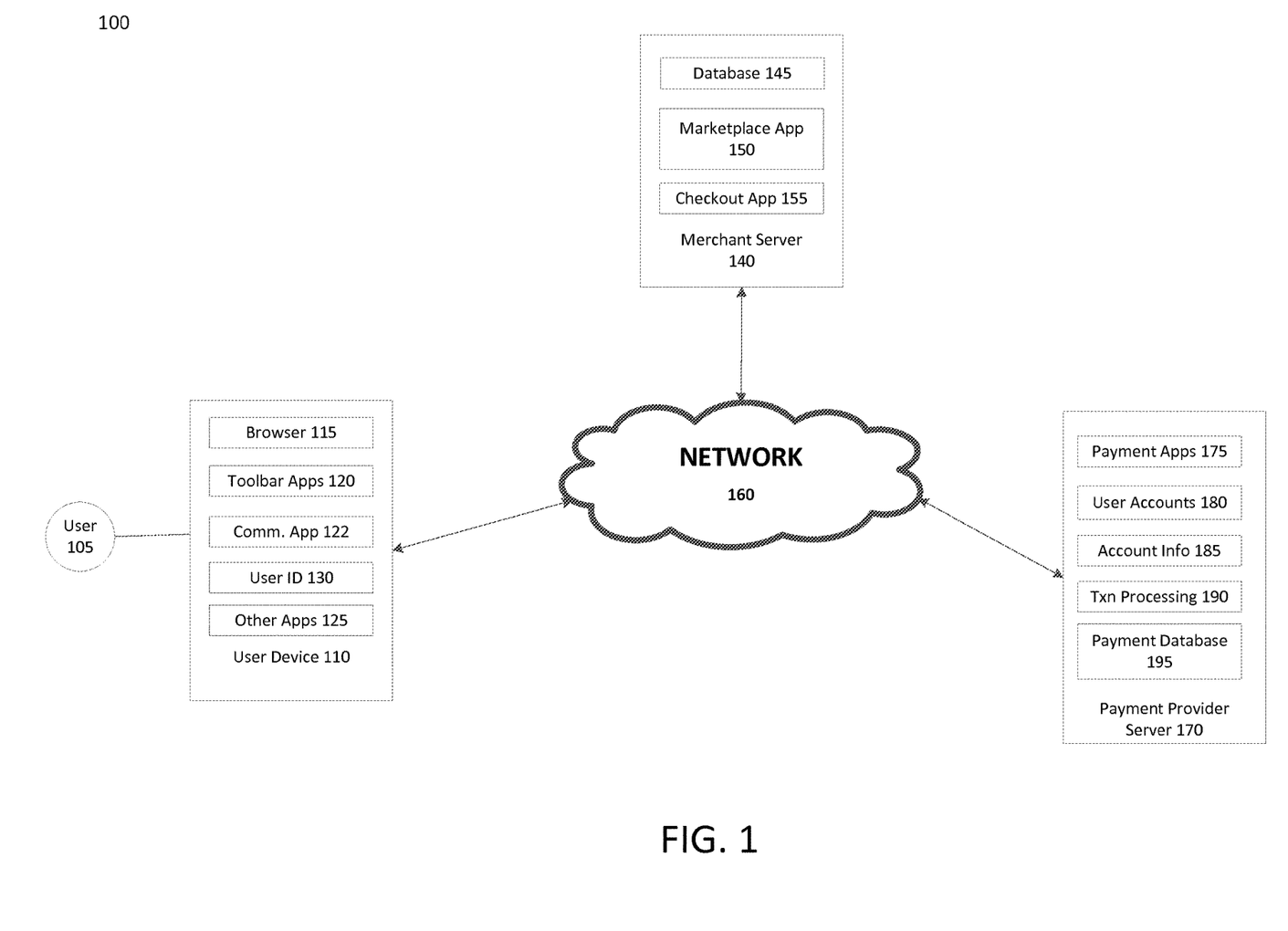
FIG. 1 is block diagram of a networked system suitable for implementing notifications of incentives offered by funding sources according to an embodiment.

FIG. 1 is a block diagram of a networked system 100 configured to implement a process for notifications of incentives offered by funding sources in accordance with an embodiment of the invention. Networked system 100 may comprise or implement a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, a merchant server 140, and a payment provider server 170 in communication over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, and payment provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, wearable device, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a smart wallet through the payment provider as discussed above.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may include applications for collecting location data, such as geo-location data via Global Positioning System (GPS), temperature data, altitude data, humidity data, data regarding device movement, ambient sound data, imaging data via a camera, and etc. Further, geo-fencing or wireless beacon technology may be used to define a location. User device 110 may detect signals from devices that implement geo-fencing or wireless beacon technology. These environmental data may be utilized to determine a location or environment in which user device 110 is located.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be a donation to charity. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, user names, phone numbers, credit card information, bank information, or other financial information which may be used to facilitate online transactions by user 105. Account information may also include user purchase history and user ratings. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, including for initial purchase and payment after purchase as described herein. As such, transaction processing application 190 may store details of an order from individual users, including funding source used, credit options available, etc. Payment application 175 may be further configured to determine the existence of and to manage accounts for user 105, as well as create new accounts if necessary.

In one embodiment, payment provider server 170 may receive information related to incentives offered by various funding sources of user 105's account. For example, a funding source may partner with a merchant to offer incentives to a customer when the customer uses the funding source to make payments at the merchant. The incentives may include additional cash backs, reward points, discounts, and the like. The funding source may partner with a plurality of merchants to offer different incentives at different merchants. Further, a merchant may operate a plurality of stores at different locations. Payment provider server 170 may include an incentive database storing information regarding the various incentives offered by various funding sources at various merchants and locations of merchants. The incentive database may continuously be updated to store the most updated incentive information.

Figure 2:
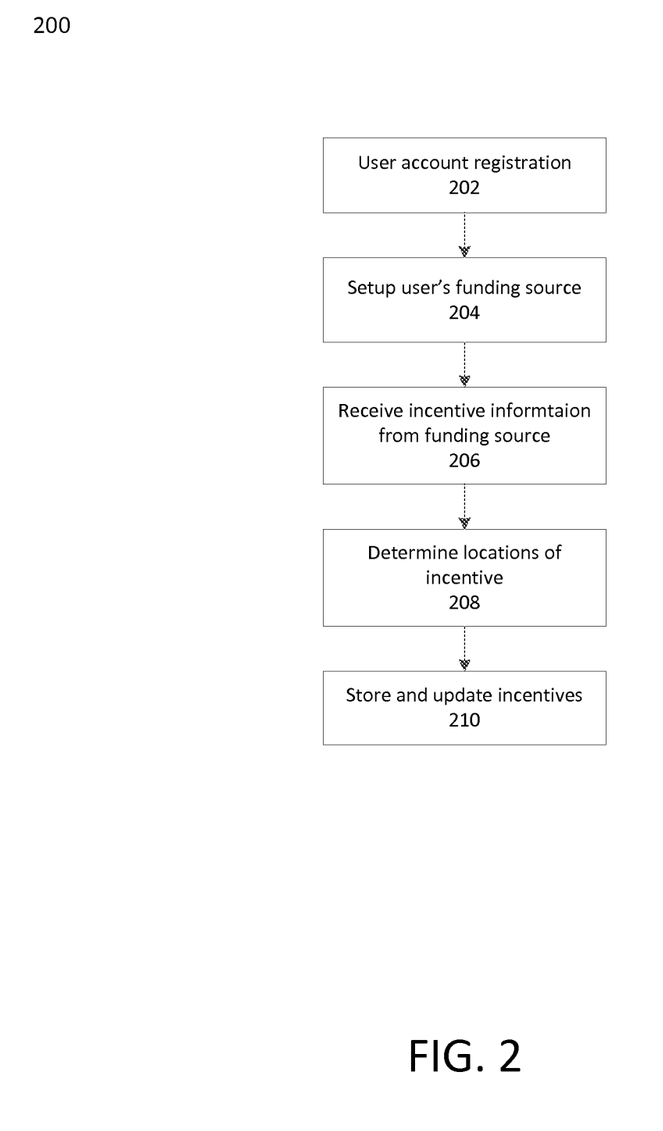
FIG. 2 is a flowchart showing a process for determining and updating incentive locations according to one embodiment.

FIG. 2 is a flowchart showing a process 200 for determining and updating incentive locations according to one embodiment. At step 202, payment provider server 170 may receive user 105's account registration. In particular, user 105 may set up a payment account at the payment service provider to make and receive payments. At step 204, user 105 may designate one or more funding sources, such as credit cards, debit cards, bank accounts, gift cards, and the like, that may be used to fund the payment account or to make payments.

At step 206, payment provider server 170 may receive incentive information from the funding sources designated in user 105's account. The incentive information may include reward programs, offers, discounts, and the like. The incentive information may designate one or more merchants where the incentives may be redeemed by user 105. For example, a funding source may partner with one or more merchants to offer incentives to entice user 105 to make purchase at these merchants. In particular, the incentives may be redeemed if user 105 makes purchase at these merchants using the funding source for payment. In an embodiment, bundle discounts may be redeemed by making a certain combination of purchases. For example, 10% discount may be redeemed if user 105 buys a certain brand of clothing from a particular merchant using a specific credit card. Incentives may be time-based, where user 105 receives the benefit of the incentive only if a purchase is made with the designated funding source within a certain time period or before an expiration time.

Payment provider server 170 may contact or connect with owners or operators of the funding sources to retrieve or obtain information related to incentive programs offered by the various funding sources. For example, based on a Bank Identification Number (BIN) of a credit card, the issuer bank may be identified and contacted to retrieve the incentive programs offered by the issuer bank of the credit card. Similarly, routing number of bank accounts may be used to identify banks to retrieve information related to the banks' incentive programs.

In an embodiment, the incentive information may designate a merchant with multiple locations where incentives may be redeemed by user 105. In another embodiment, the incentive information may designate a category or a type or merchants where incentives may be redeemed by user 105. Different incentives may be offered at different merchants or types of merchants. For example, one percent cash back may be offered at grocery stores while two percent cash back may be offered at gas stations. In another example, five percent discount may be offered at all locations of a particular department store. Each funding source may have its own incentive program designating various incentives that may be eared at various merchants and locations.

At step 208, payment provider server 170 may determine the locations where various incentives may be redeemed. In particular, the geographical locations of merchants where incentives may be redeemed by using certain funding source to make payments may be determined. The incentive locations may include merchant's stores, food stands, public places, theaters, restaurants, concert halls, ball parks, stadiums, parking lots, shopping malls, banks, internet websites, or any place where payments may be made. The incentive locations may be described using Global Positioning System (GPS) coordinates. In an embodiment, the incentive locations may be designated with particular geo-fencing or beacon signals. Further, online incentive locations may be designated with the respective web address. Information for the incentive locations may be pulled from merchant's location database or from search engines or merchant portals.

At step 210, payment provider server 170 may store and update incentives offered by user 105's designated funding sources in an incentive database. The incentive database may be updated periodically to reflect most recent incentives offered by the respective funding sources. In an embodiment, payment provider server 170 may determine incentives for locations near user 105. For example, payment provider server 170 may collect incentive locations within 10 miles radius from the location of user 105. As user 105 moves, additional incentives may be determined for the user 105's new location. Thus, it is not necessary to determine all incentive locations from everywhere, but ones near user 105. The incentive database may include a list of incentives offered at various merchants for various funding sources. Each incentive may include information related to the funding source, the merchant, conditions for earning the incentives, locations, effective date or time period, restrictions, and the like.

Each incentive may include notification settings indicating whether and how user 105 is to be notified for the incentive. In particular, a notification may be triggered and sent to user 105 when user 105 is approaching or located within a predetermined distance from the incentive location. In an embodiment, a time and location where user 105 allows notifications to be presented to user 105 may be designated. For example, the user 105 may restrict notifications during work hours or at user 105's work place. In an embodiment, certain incentives may be presented to user at certain types of locations while hidden at other types of locations. For example, incentives for personal items may be presented to user 105 during non-business hours while incentives for office items may be presented to user 105 during business hours.

In an embodiment, the system may allow user 105 to designate the type or category of incentives that are presented to user 105. For example, user 105 may allow only incentives related to food merchants or apparel merchants to be notified to user 105. In another embodiment, user 105 may designate the manner notifications are presented to user 105. For example, user 105 may wish to receive notifications by one or more of a text message, an email, an instant message, or the like.

By using the above process 200, various incentive programs offered by various funding sources may be determined. In particular, locations where incentives may be redeemed may be determined and stored in the incentive database. The incentive database may continuously be updated to reflect the most recent incentives offered by various funding sources. Further, the system may allow user 105 to set and change various notifications settings based on user 105's preferences.

Figure 3:
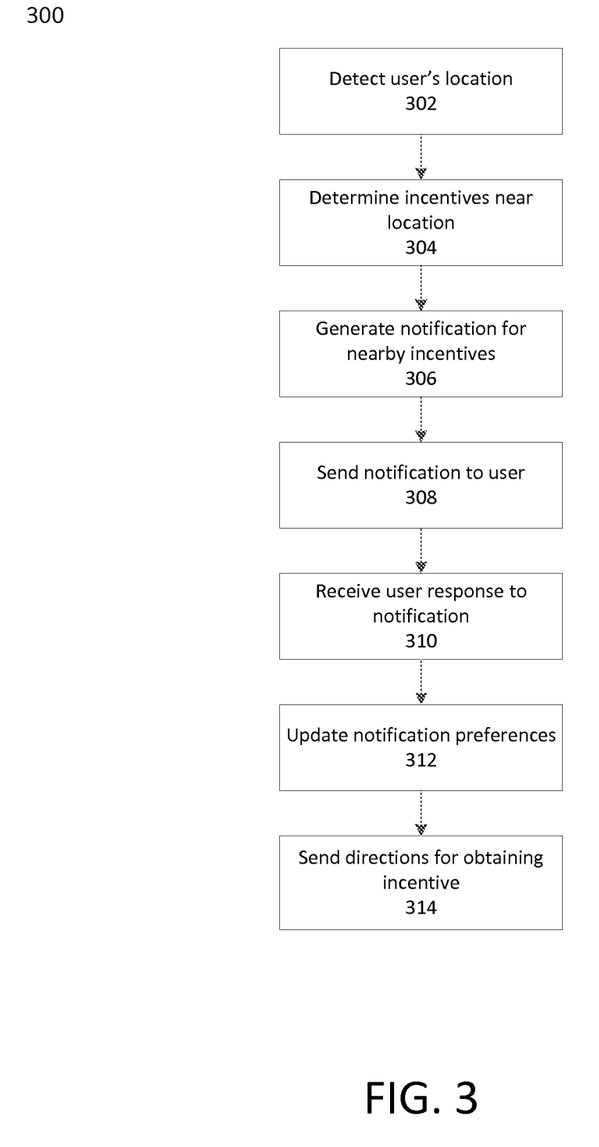
FIG. 3 is a flowchart showing a process for generating and presenting notifications of incentives according to one embodiment.

FIG. 3 is a flowchart showing a process for generating and presenting notifications of incentives offered by funding sources according to one embodiment. At step 302, payment provider server 170 may receive or detect user 105's location. For example, user device 110 may detect the location of user device 110 via GPS or positioning beacons, such as WiFi or Bluetooth beacons. The location of user device 110 may be sent to payment provider server 170.

At step 304, payment provider server 170 may determine incentive locations near user 105. In particular, payment provider server 170 may access the incentive database to find incentives that are offered at locations near user 105. For example, the GPS coordinate of user 105 may be used to find incentives located near user 105. In an embodiment, the movement of user 105 may be tracked or monitored to determine whether user 105 is approaching or departing from a certain incentive location.

Each incentive location, such as merchant store, may have a predetermined notification zone, within which an incentive notification is sent to user 105 when entered by user 105. Different incentive locations may have different sizes or shapes of notification zones. The system may allow merchants to set or adjust their notification zones. For example, a circular area with a certain radius from an incentive location may be defined as a notification zone for the incentive location. Other shapes of notification zones may be used for different incentive locations based on the layout or location of the incentive location. For example, a notification zone may be defined based on a perimeter shape of a merchant's store, e.g., 10 feet from the perimeters of the store.

In an embodiment, the size of the notification zone may be defined based on traffic type or flow of consumers around the incentive location. For example, a merchant store located next to a highway may have a larger notification zone, e.g., a radius of 1 mile, because consumers may be traveling in cars and approaching the merchant store at relative high speeds. As such, the consumers traveling on the highway may need to be notified farther away from the merchant store, such that the consumers may have time to slow and stop for the merchant store. In another example, a merchant store located in a shopping mall may have a relative smaller notification zone, e.g., 30 feet radius, because consumers may be walking at relative low speeds around the merchant store in the shopping mall.

In an embodiment, the location and area of the notification zone may be determined based on the direction or location of the consumer traffic flow relative to the incentive location. For example, a merchant store may have multiple notification zones to target particular areas where consumers are located. The merchant store may have a notification zone directly in front of the entrance of the merchant store, a notification zone along the street in front of the merchant store, and a notification zone around a water fountain near the merchant store where people tend to congregate. Thus, based on the consumer traffic flow or where consumers are located, different notification zones may be designated for an incentive location.

In an embodiment, the notification zones of an incentive location may change based on different time of a day, different day of a week, or different seasons in a year. For example, a merchant store may have a notification zone at a park near the merchant store in summer time to entice consumers hanging out at the park during summer time and may have a notification zone at an indoor shopping mall during winter time when consumer stay inside during winter time. In another example, a merchant store may have a notification zone at one side of a busy street during morning rush hour and may move the notification zone to the other side of the busy street during evening rush hour to capture respective rush hour consumer traffics on different sides of the same street at different time.

At step 306, payment provider server 170 may generate notifications for nearby incentives. In particular, a list of incentives offered near user 105 may be found in step 304. Among the list of incentives, payment provider server 170 may determine whether notifications should be generated and presented to user 105 based on user 105's notification settings. Notification settings may include a distance from incentive location within which a notification is to be generated and presented to user 105. Different incentives may have different distances. For example, user 105 may set a distance of 30 feet for restaurant incentives, as such, when user 105 is located within 30 feet from a restaurant where an incentive is offered, a notification may be generated and presented to user 105.

Notification settings may also include types or categories of incentives that user 105 desires to be notified. In an embodiment, notifications may not be generated and presented to user 105 if the incentives are not desired by user 105. Notification settings also may include other conditions, such as time, location setting, user schedule, and the like, that may allow or restrict different notifications. For example, notifications may not be generated during work hours or at work place based on user 105's calendar or schedule.

If user 105 is approaching an incentive location or is located within a notification zone of an incentive location and conditions are appropriate based on user 105's notification settings, a notification may be generated to inform user 105 of the incentive located near user 105. The notification may include description of the incentive, merchant where incentive may be used, funding source by which incentive may be used, location of the merchant, directions on how to utilize the incentive, conditions and restrictions. For example, the notification may indicate that "a 10% discount is offered at a particular department store if purchases are paid with a certain credit card. The particular department store's location and the incentive cannot be combined with other incentives. The incentive only is valid for this weekend."

At step 308, the generated notification may be sent to user 105 to notify user 105. In particular, the notification may be sent in a manner according to user 105's notification settings. For example, user 105 may designate texting as the method for receiving incentive notification, as such the notification may be sent to user device 110 via text. In an embodiment, the notification may be a pop-up notification generated from a payment app installed on user device 110. In some embodiments, audio sound or vibration may accompany the notification to get user 105's attention.

At step 310, payment provider server 170 may receive user 105's response to the notification. In particular, user 105 may accept or reject the incentive. For example, buttons may be provided for user 105 to accept or reject the incentive. If user 105 accepts the incentive, the incentive may be activated or stored for later use by user 105. For example, the incentive may be stored and may automatically be applied to user 105's purchase at the merchant when user 105 makes payment using the designated funding source. If user 105 rejects the incentive, the incentive may be flagged such that the same incentive is not presented to user 105 again for a predetermined period of time, such as a week or a month.

At step 312, notification preferences or settings may be updated based on user 105's response to the incentive notification. For example, if the incentive is accepted, payment provider server 170 may increase the probability for generating notifications for incentives similar to the accepted incentive. If the incentive is rejected, the probability that notifications for similar incentives are generated is decreased.

In some embodiment, a response option "ok, but not now" may be presented to be selected by user 105. Thus, user 105 may select the "ok, but not now" option to indicate that user 105 is interested in the incentive, but the timing or location is not appropriate for presenting the notification to user 105. As such, based on this response, payment provider server 170 may adjust or change the preferred location or timing of sending notification for similar incentives. For example, user 105 may be near a restaurant and an incentive for the restaurant is notified to user 105. User 105 may respond "ok, but not now," because it is not meal time yet. Thus, the system may adjust the notification setting to notify user 105 of similar incentives related to food or restaurant during meal time.

In some embodiments, a response option "Do not notify this type of incentive again" may be presented to be selected by user 105. Thus, user 105 may indicate to the system that user 105 do not wish to be notified of a certain type of incentive. Payment provider server 170 may adjust the notification settings to prohibit further notifications related to this type of incentive.

In some embodiments, an interface may be provided to present a map of nearby incentive locations to user 105. For example, a map indicating locations where incentives are offered relative to user's location may be presented on user device 110. Thus, user 105 may select one of the presented incentives on the map. In an embodiment, user 105 may choose to display a certain type of incentives on the map. For example, user 105 may choose to display apparel related incentives. User also may choose to display incentives for a certain funding source. Thus, incentives offered by a particular funding source may be presented to user 105 on the map.

At step 314, if user 105 decides to accept the incentive, directions on how to earn or obtain the incentive may be presented to user 105. For example, directions on how to travel to the incentive location, conditions required to earn the incentive, and the like may be presented to user 105. When user 105 makes a payment using the designated founding source at the designated merchant later, the incentive may automatically be applied to purchases made by the user.

By using the above process 300, notifications for incentives offered by various funding sources may be notified to user 105 based on user 105's location. Further, user 105's response to the notification may help improve notification settings for user 105. The notifications may provide directions on how to find the incentive location and conditions required to earn the incentives. Thus, user 105 may be reminded or notified automatically when user 105 is near or is approaching locations or merchants where incentives are available from various funding sources. Accordingly, user 105 may be enticed in real time to utilize these incentives offered by various funding sources. Note that combinations of incentives may be provided, and not just single incentives. For example, a user may be notified that if funding source A and funding source B are used at merchant X to make a purchase over $50 today, additional benefits may be obtained than just using funding source A or funding source B. Having a payment provider that allows a user to have multiple funding sources that can be combined to make a single payment through the user's account or wallet with the payment provider gives the flexibility of using multiple funding sources for a single purchase at a merchant.

In the above processes, the steps are executed at payment provider server 170. In one embodiment, the steps may be executed at user device 110 or merchant server 140. In still another embodiment, the steps may be executed among payment provider server 170, user device 110, and merchant server 130 in coordination with each other.

The following are exemplary scenarios in which the above processes may be implemented.

Example 1

A user of a payment account at a payment service provider designates various credit cards, bank accounts, and other funding sources to make payments. These funding sources offer various incentives at various merchants. The user installs a payment application from the payment service provider at the user's mobile device to facilitate payments. The user typically uses the payment application on the mobile device to make payments electronically at various merchants. In particular, the user allows the payment application to notify the user of nearby incentives offered by various funding sources.

The user is shopping in a mall today. While the user is walking in the shopping mall, the payment application on the mobile device monitors the user's location and movement and detects that the user is approaching an apparel store where a particular credit card is offering discounts. The payment application generates a notification: "Use XXX credit card and gat 10% discount at XXX apparel." The user is notified of this incentive and decides to accept the incentive. The payment application then generates additional directions "XXX apparel store is located 50 feet on your right. Use XXX credit card to get 10% off automatically." As such, the user receives directions on how to visit the store and how to obtain the discount.

The user is driving home from the shopping mall. The payment application detects that the user is approaching a restaurant at which another credit card is offering additional cash backs. The payment application generates a notification "Use YYY credit card at YYY restaurant to receive 5% cash back." Because the user is driving, the notification is presented to user via audio voice. The user does not accept the incentive because it is not yet dinner time. The user says "Not now." The payment application receives the user's voice command and determines that the user does not want to use this incentive now. The payment application adjusts the notification settings to present notification related to food or restaurants only during meal time. Accordingly, the user is properly notified of various incentives offered by various funding sources at various merchants. Both the merchants and the funding sources may effectively entice consumers to increase sales and payment volume.

Figure 4:
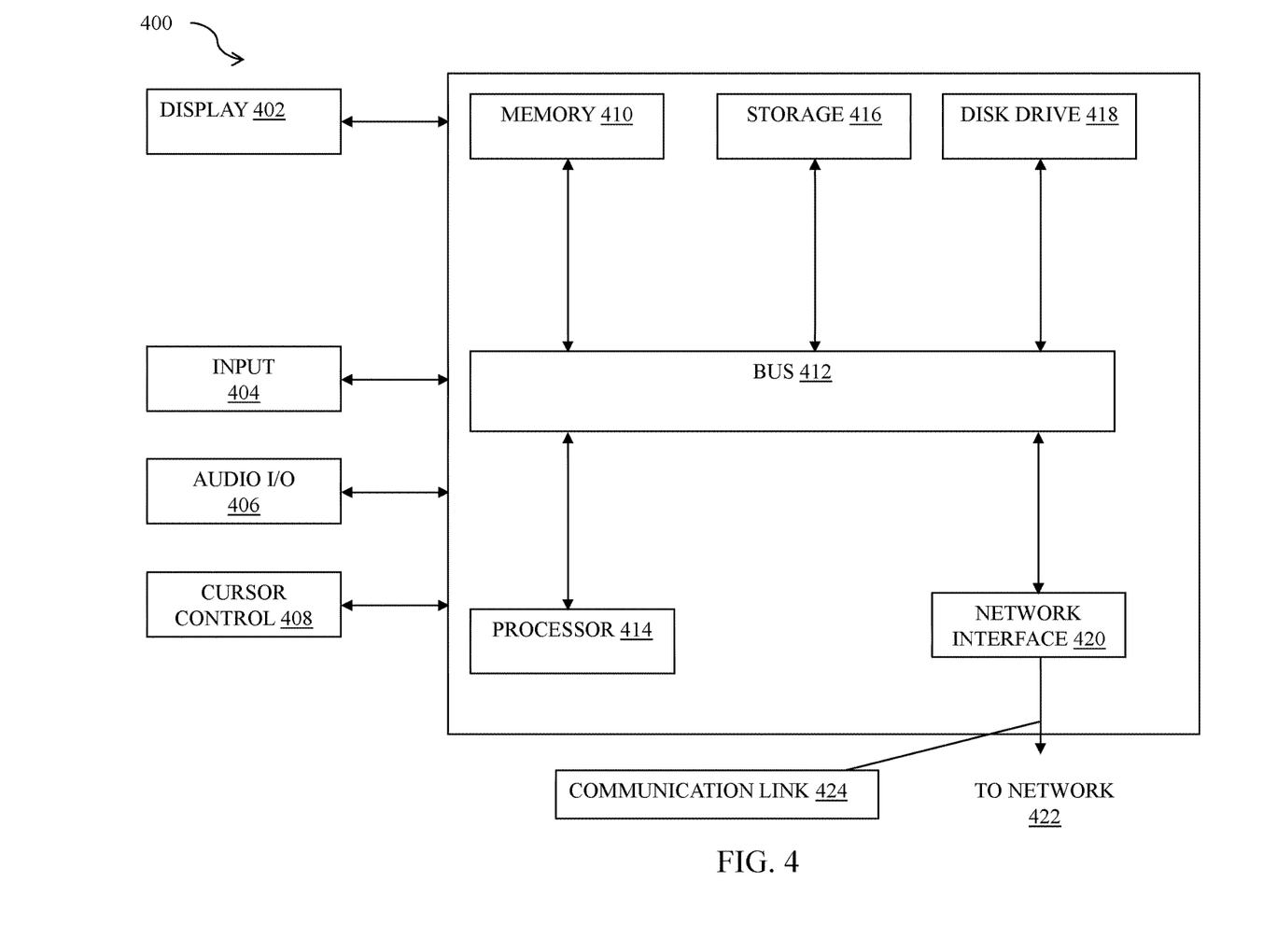
FIG. 4 is a block diagram of a computer system suitable for implementing one or more components in FIG. 1 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, wearable device, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving, from a user device, a plurality of communications comprising geo-location data generated by the user device indicating a current location of the user device;
determining a funding source based on a bank identification number of a payment card associated with a user of the user device;
determining a plurality of incentives for locations within a threshold distance from the current location of the user from a list of incentives offered at a plurality of merchants for a plurality of funding sources;
tracking the current location of the user device based on the plurality of communications;
updating the plurality of incentives for locations within the threshold distance from the current location of the user based on the tracked current location of the user device;
determining an incentive offered by the funding source, based on determining the funding source and the updated plurality of incentives for locations within the threshold distance from the tracked current location of the user device;

determining a direction of traffic flow at a current time at a merchant location for a merchant associated with the location based on tracking the current location of the user device;

determining a notification zone for the current location of the user device based on the direction of the traffic flow and a current time, wherein the notification zone comprises a geo-fenced area within which the user device is notified of the incentive offered by the funding source, and wherein the notification zone changes based on the directions of traffic flow at different times at the merchant location;

determining a travel mode used by the user within the notification zone based on a rate of travel of the user device through the notification zone based on the geo-location data based on tracking the current location of the user device;

determining the incentive offered by the funding source within the notification zone based on the travel mode;

in response to determining that the current location of the user device is within the notification zone, generating a notification of the incentive, wherein the notification comprises an executable response option that causes the system to update notification settings for the user device;

generating an interactive map interface comprising at least a location of the incentive, wherein the interactive map interface comprises options to display additional incentives for one or more funding sources including the funding source within the notification zone; and in response to communicating the interactive map interface with the notification to the user device, automatically causing the interactive map interface to be displayed through an application executing on the user device based on the geo-location data without a user search for the incentive.

2. The system of claim 1, wherein the incentive designates a merchant store at the merchant location at which the incentive is redeemed by making a payment using the funding source.

3. The system of claim 1, wherein the notification is presented to the user device based on the notification settings.

4. The system of claim 3, wherein the notification settings define a manner of presenting, using the user device, the notification including one or more of a display of a graphical user interface of the user device, an audio sound, or a vibration of the user device.

5. The system of claim 1, wherein the operations further comprise:

determining a perimeter shape of a merchant store at the merchant location.

6. The system of claim 1, wherein the determining the notification zone is further based on a size of traffic flow at the merchant location.

7. The system of claim 1, wherein the operations further comprise:

receiving a response from the user device accepting the incentive; and presenting directions for earning the incentive on the user device.

8. The system of claim 1, wherein the operations further comprise:

receiving a response from the user device rejecting the incentive; and updating incentive preferences of the user device based on the response rejecting the incentive, wherein the incentive preferences comprise a probability for generating notifications for incentives of a same type as the incentive.

9. The system of claim 1, wherein the notification zone comprises a size based on traffic flow at the merchant location.

10. The system of claim 1, wherein the operations further comprise:

adjusting a plurality of multiple notification zones based on traffic flow.

11. The system of claim 1, wherein the notification zone changes over time based on a traffic pattern of traffic flow of consumers within a distance to the location of a merchant.

12. A method for using a notification zone, the method comprising:

receiving, by a processor of a payment service provider from a user device, a plurality of communications comprising geo-location data generated by the user device indicating a current location of the user device;

determining a funding source based on a bank identification number of a payment card associated with a user of the user device;

determining a plurality of incentives for locations within a threshold distance from the current location of the user from a list of incentives offered at a plurality of merchants for a plurality of funding sources;

tracking the current location of the user device based on the plurality of communications;

updating the plurality of incentives for locations within the threshold distance from the current location of the user based on the tracked current location of the user device;

determining an incentive offered by the funding source, based on determining the funding source and the updated plurality of incentives for locations within the threshold distance from the tracked current location of the user device;

determining a direction of traffic flow at a current time at a merchant location for a merchant associated with the location based on tracking the current location of the user device;

determining a notification zone for the location of the user device based on the direction of the traffic flow and a current time, wherein the notification zone comprises a geo-fenced area within which the user device is notified of the incentive offered by the funding source, and wherein the notification zone changes based on the directions of the traffic flow at different times at the merchant location;

determining a travel mode used by the user device within the notification zone based on a rate of travel of the user through the notification zone based on the geo-location data based on tracking the current location of the user device;

determining the incentive offered by the funding source within the notification zone based on the travel mode;

in response to determining that the current location of the user device is within the notification zone, generating, by the processor, a notification of the incentive, wherein the notification comprises an executable response option that causes the payment service provider to update notification settings for the user device;
generating an interactive map interface comprising at least a location of the incentive, wherein the interactive map interface comprises options to display additional incentives for one or more funding sources including the funding source within the notification zone; and
in response to communicating the interactive map interface with the notification to the user device, automatically causing the interactive map interface to be displayed through an application executing on the user device based on the geo-location data without a user search for the incentive.

13. The method of claim 12, wherein the notification zone is defined based on the merchant location of the merchant at which the incentive is offered.

14. The method of claim 13, wherein the notification zone is an area within a particular radius from the merchant location of the merchant.

15. The method of claim 13, wherein the notification zone is an area defined by a perimeter of the merchant location of the merchant.

16. The method of claim 13, wherein a size of the notification zone is defined based on an average speed of traffic flow of customers within a distance to the location of the merchant.

17. The method of claim 13, wherein the notification zone changes over time based on a traffic pattern of traffic flow of consumers within a distance to the location of the merchant.

18. The method of claim 13, wherein the notification zone is defined by the merchant based on a traffic pattern of traffic flow of customers within a distance to the location of the merchant.

19. The method of claim 12, wherein the determining the notification zone comprises determining a perimeter shape of a merchant store at the merchant location.

20. A non-transitory machine-readable medium comprising instructions which, in response to execution by a computer system, cause the computer system to perform operations comprising:
receiving, from a user device, a plurality of communications geo-location data generated by the user device indicating a current location of the user device associated with a payment account registered at a payment service provider;
determining a funding source based on a bank identification number of a payment card associated with a user of the user device;
determining a plurality of incentives for locations within a threshold distance from the current location of the user from a list of incentives offered at a plurality of merchants for a plurality of funding sources;
tracking the current location of the user device based on the plurality of communications;
updating the plurality of incentives for locations within the threshold distance from the current location of the user based on the tracked current location of the user device;
determining an incentive offered by the funding source, based on determining the funding source and the updated plurality of incentives for locations within the threshold distance from the tracked current location of the user device;
determining a direction of traffic flow at a current time at a merchant location for a merchant associated with the location based on tracking the current location of the user device;
determining a notification zone for the current location of the user device based on the direction of the traffic flow and a current time, wherein the notification zone comprises a geo-fenced area within which the user device is notified of the incentive offered by the funding source, and wherein the notification zone changes based on directions of traffic flow at different times at the merchant location;
determining a travel mode used by the user within the notification zone based on a rate of travel of the user device through the notification zone based on the geo-location data based on tracking the current location of the user device;
determining the incentive offered by the funding source within the notification zone based on the travel mode;
in response to determining that the current location of the user device is within the notification zone, generating a notification of the incentive, wherein the notification comprises an executable response option that causes the system to update notification settings for the user device;
generating an interactive map interface comprising at least a location of the incentive, wherein the interactive map interface comprises options to display additional incentives for one or more funding sources including the funding source within the notification zone; and
in response to communicating the interactive map interface with the notification to the user device, automatically causing the interactive map interface to be displayed through an application executing on the user device based on the geo-location data without a user search for the incentive.

21. The non-transitory machine-readable medium of claim 20, wherein the operations further comprise:
receiving a response from the user device accepting the incentive;
receiving, from the payment service provider, information related to directions for obtaining the incentive at the merchant located within a first distance to the user device; and
presenting the directions for obtaining the incentive using the user device.

22. The non-transitory machine-readable medium of claim 20, wherein the operations further comprise:
receiving a payment request from the user device for a purchase; and
automatically applying the incentive to the purchase when the payment request utilizes the funding source for the purchase.

23. The non-transitory machine-readable medium of claim 20, wherein the incentive is presented on the user device via one or more of a display on the user device, an audio sound, or a vibration at the user device.

24. The non-transitory machine-readable medium of claim 20, wherein the incentive is offered by the funding source and another funding source in cooperation; and
wherein the incentive is redeemable by making a payment using both the funding source and the another funding source.

* * * * *